United States Patent [19]

Kobayashi et al.

[11] 4,123,576
[45] Oct. 31, 1978

[54] BONDING A MULTI-LAYERED STRUCTURE OF OLEFIN-CONTAINING AND NITRILE-CONTAINING POLYMERS AND ARTICLE

[75] Inventors: Akio Kobayashi; Masaki Ohya, both of Iwaki, Japan

[73] Assignee: Kureha Kagaku Kogyo Kabushiki Kaisha, Tokyo, Japan

[21] Appl. No.: 706,559

[22] Filed: Jul. 19, 1976

[30] Foreign Application Priority Data

Jul. 23, 1975 [JP] Japan .................................. 50/89130

[51] Int. Cl.² ........................ B65D 89/00; B65D 1/02
[52] U.S. Cl. ........................................ 428/35; 428/36; 428/515; 428/516; 428/517; 428/518; 428/519; 428/520; 260/29.4 R; 260/29.4 UA; 260/851; 156/242; 215/1C
[58] Field of Search .................... 428/35, 36, 515–520; 156/242; 260/29.4 R, 29.4 UA, 851; 215/1 C; 264/173, 209, 241

[56] References Cited

U.S. PATENT DOCUMENTS

| | | | |
|---|---|---|---|
| 3,837,517 | 9/1974 | Held, Jr. ............................ | 428/35 X |
| 3,944,100 | 3/1976 | Brockway et al. ................ | 428/35 X |
| 3,955,697 | 5/1976 | Valyi ................................. | 428/520 X |
| 3,993,810 | 11/1976 | Boms ................................. | 428/519 X |
| 4,015,033 | 3/1977 | Nield ................................. | 428/35 |

FOREIGN PATENT DOCUMENTS 1,142,514  1/1963  Fed. Rep. of Germany ........... 428/520

*Primary Examiner*—P. C. Ives
*Attorney, Agent, or Firm*—Wenderoth, Lind & Ponack

[57] ABSTRACT

A synthetic-resin laminated structure is fabricated by bonding together in a molten state a layer of a nitrile-containing polymer (I), an interposed layer of a polymer mixture (II) comprising a nitrile-containing polymer (A) and an olefin-containing polymer (B) blended together, and a layer of an olefin-containing polymer (III). The laminated structure may have more than three layers, but the layer of the polymer mixture (II) is always interposed between the layers of the polymers (I) and (III). The laminated structure may be in the form of a sheet, a tube, or a hollow article such as a bottle.

17 Claims, 4 Drawing Figures

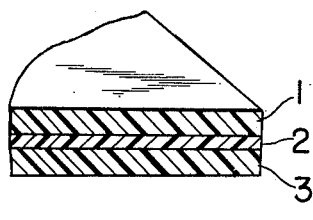
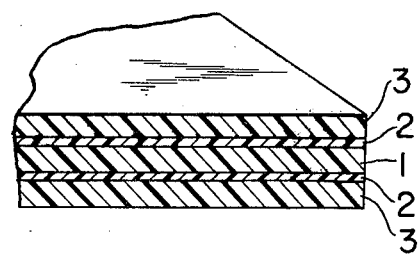
FIG. 1(A)　　　FIG. 1(B)
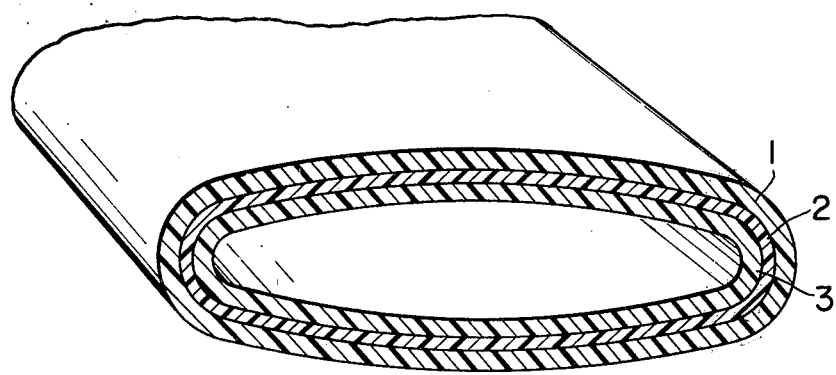
FIG. 2
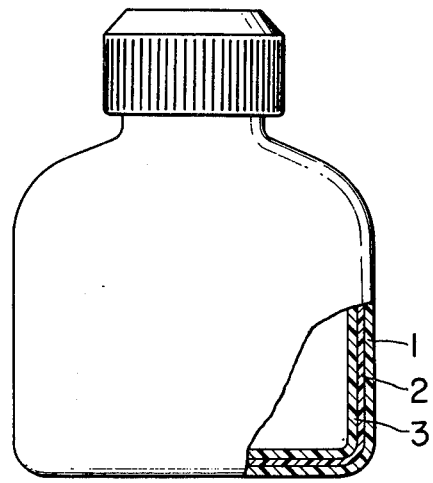
FIG. 3

BONDING A MULTI-LAYERED STRUCTURE OF OLEFIN-CONTAINING AND NITRILE-CONTAINING POLYMERS AND ARTICLE

BACKGROUND OF THE INVENTION

This invention relates generally to novel multilayer synthetic-resin laminated structures and a process for producing the same. More particularly, the invention relates to a process for producing a multilayer composite formed article from an olefin-containing polymer and a polymer containing nitrile, which process is characterised by the interposition of a polymer mixture formed by blending an olefin-containing polymer and a nitrile-containing polymer between an olefin-containing polymer layer and a nitrile-containing polymer layer for the purpose of imparting high adhesive strength between the two polymer layers.

Heretofore, olefin-containing polymers have been widely used in many fields as packaging materials in formed articles such as blow-molded bottles, sheet, films, and tubes. Olefin-containing polymers, however, have the characteristic of having high permeability with respect to inorganic gases such as oxygen and carbon dioxide gases and to organic gases such as hydrocarbon gases. For this reason, these materials have not yet been used in applications requiring a gas-barrier characteristic as in the fields of packaging of products such as foodstuffs, pharmaceutical products, and cosmetics.

On one hand, nitrile-containing polymers, in general, have very low gas permeability with respect to inorganic and organic gases, but their gas-barrier characteristic with respect to water vapor cannot be said to be satisfactory in comparison with that of olefin-containing polymers. Furthermore, olefin-containing polymers, in general, possess excellent pliability and also high impact strength and also have good resistance to low temperatures. On the other hand, polymers containing nitrile, in general, have high rigidity and poor pliability in the case of products with a thick wall, and insufficient impact strengths. Accordingly, with the aim of making most of the desirable characteristics of the two kinds polymers, a method wherein the two kinds of polymers are rendered into a composite structure by superimposing thereof in layered or laminated form has been used. By this method, materials possessing excellent properties are produced.

In general, resins of various kinds are rendered into a composite material of layered form by mutual adhesion by a method which comprises prefabricating beforehand the materials in layered form and then applying heat and pressure thereto to cause adhesion by heat fusion or by a melt adhesion method which conprises cocurrent melt extrusion (coextrusion) by which the individual resins are caused in molten state to adhere to each other within or outside of the extrusion die. Still another method is the so-called lamination method wherein layer materials formed beforehand are bonded together with an adhesive.

In the production of a composite formed product by bonding together a nitrile-containing polymer and an olefin-containing polymer, however, these resins cannot be amply bonded together by any of these methods, or, even if bonding thereof is possible, various restrictions are imposed on the materials or the fabrication process, whereby disadvantages in production or economy cannot be avoided. More specifically, in the case of forming a composite structure by the lamination method, various restrictions relating to properties and performance are imposed on the adhesive, and only a limited number of kinds thereof can be used. Furthermore, the adhesive itself is expensive, and, moreover, the application of the adhesive is complicated, making this technique disadvantageous in production and cost.

The method of bonding the resins in molten state, in general, is simple, convenient and economical. However, when an attempt is made to bond by the heat fusion method of a nitrile-containing polymer (I) and an olefin-containing polymer (III), sufficient adhesion between the two polymers cannot be obtained, and the melt adhering method such as coextrusion cannot be effected.

SUMMARY OF THE INVENTION

It is an object of this invention to provide, in the melt adhesion of a nitrile-containing polymer (I) and an olefin-containing polymer (III), a polymer mixture (II) interposed in layer form between the two resin layers thereby to make possible melt adhesion of the two resin layers.

Another object of this invention is to provide a process for producing composite formed products of high barrier characteristic with respect to gases such as inorganic and organic gases and water vapor.

Still another object of this invention is to provide composite formed products having excellent mechanical strength and a process for producing the same.

In one aspect of the present invention, briefly summarized, there is provided a synthetic-resin laminated structure comprising a first structure of a nitrile-containing polymer (I), a second structure of a polymer mixture (II) comprising a nitrile-containing polymer (A) and an olefin-containing polymer (B) blended together, and a third structure of an olefin-containing polymer (III). These first, second, and third structures are bonded together in a laminated state with the second structure interposed between the first and third structures.

Another aspect of the invention, briefly summarized, provides a process for producing a synthetic-resin laminated structure which comprises bonding together, in laminated state, a first structure of a nitrile-containing polymer (I), a second structure of a polymer mixture (II) comprising a nitrile-containing polymer (A) and an olefin-containing polymer (B) blended together, and a third structure of an olefin-containing polymer (III), said second structure being interposed between said first and third structures.

The nature, principle, utility, and further features of this invention will be apparent from the following detailed description beginning with a consideration of general features of the invention and concluding with numerous specific examples of practice illustrating preferred embodiments of the invention.

BRIEF DESCRIPTION OF THE DRAWINGS

In the drawing:

FIGS. 1(A) and 1(B) are enlarged, fragmentary perspective views, respectively, showing synthetic-resin laminated sheets of three and five plies or layers according to this invention;

FIG. 2 is a fragmentary perspective view, with wall thickness enlarged for the sake of clarity, of a tubular structure according to the invention; and FIG. 3 is an elevation, with a part cut away, showing a bottle representative of a hollow structure according to the invention.

DETAILED DESCRIPTION

The resin compositions of the various layers constituting the multilayer composite products of the invention will first be described.

The nitrile-containing polymer (I) is a thermoplastic resin formed by copolymerization of a monomer mixture comprising (a) 40 to 90, preferably 60 to 85, mol percent of acrylonitrile or methacrylonitrile and (b) 10 to 60, preferably 15 to 40 mol percent of at least one kind of monomer copolymerizable with acrylonitrile or methacrylonitrile.

This nitrile-containing resin has low permeability relative to gases such as oxygen and carbon dioxide gases and is receiving attention as a basic material for packaging products such as foodstuffs, pharmaceutical products, and cosmetics.

The gas-barrier characteristic of this resin is related to the quantity of the monomer containing a nitrile group polymerized therein, the gas-barrier characteristic improving with the increase in the content of the nitrile group.

When the content of a nitrile-containing monomer in this copolymer exceeds 90 mol percent, the thermoplasticity of the copolymer is lowered, and the forming and working thereof is difficult. For this reason, a composition of the ranges set forth above is desirable.

The typical monomer (comonomer) copolymerizable with the nitrile-containing monomer in this case is:

(1) an $\alpha$-olefin such as isobutylene;

(2) an aromatic olefin represented by the formula $CH_2 = CR - Ar$ (where R is hydrogen or a methyl group, and Ar is an aromatic residue and may be nuclear substituted), examples being styrene, $\alpha$-methylstyrene, o-methylstyrene, m-methylstyrene, p-methylstyrene, and 2,5-dimethylstyrene, of which styrene and $\alpha$-methylstyrene are particularly preferable;

(3) acrylic acid or an acrylic ester represented by the formula $CH_2 = CR_1COOR_2$ (where $R_1$ is hydrogen, a methyl group, or an ethyl group, and $R_2$ is hydrogen, an alkyl group having 1 to 8 carbon atoms, or a halogen atom), examples being acrylic acid, methyl acrylate, ethyl acrylate, butyl acrylate, octyl acrylate, methyl methacrylate, ethyl methacrylate, and methyl ethacrylate;

(4) a vinyl ester represented by the formula $CH_2 = CHOOCR$ (where R is an alkyl group having 1 to 18 carbon atoms), examples being vinyl acetate, vinyl laurate, and vinyl stearate;

(5) a vinyl ether represented by the formula $CH_2 = CHOR$ (where R is an alkyl group having 1 to 4 carbon atoms), examples being methyl vinyl ether, ethyl vinyl ether, and butyl vinyl ether; or (6) a vinyl halide or a vinylidene halide represented by the formula $CH_2 = CX_1X_2$ (where $X_1$ is hydrogen or a chlorine or bromine atom, and $X_2$ is a chlorine or bromine atom) examples being unsaturated monomers such as vinyl chloride, vinyl bromide, and vinylidene chloride.

Furthermore, this nitrile-containing polymer (I) may be a so-called graft copolymer resulting from polymerization of the aforementioned monomer (a) and/or monomer (b) in the presence of an elastomer such as diene rubber, an ethylene-propylene copolymer, or an acrylate polymer. For this nitrile-containing polymer (I), moreover, a mixed resin resulting from the admixture of another resin to the nitrile-containing polymer as defined above may be used. Furthermore, this polymer (I) may be a resin as defined above to which an additive such as a plasticizer, a processing aiding agent such as a lubricant, a stabilizer, or filler has been added.

There are no particular limitations relating to the method of polymerization for obtaining the nitrile-containing polymer, which can be prepared by a known method in the presence of a polymerization initiator. More specifically, the polymerization method may be selected from bulk polymerization, solution polymerization, suspension polymerization, and emulsion polymerization.

The olefin-containing polymer (III) is a homopolymer of an $\alpha$-olefin or a copolymer of an $\alpha$-olefin and another monomer copolymerizable therewith. Examples of the $\alpha$-olefin are ethylene, propylene, and butene. Examples of the comonomer are the same vinyl ester as that defined hereinbefore and represented by the formula $CH_2 = CHOOCR$ (where R is an alkyl group having 1 to 18 carbon atoms) and acrylic acid or an acrylate ester represented by the formula $CH_2 = CHCOOR$ (where R is hydrogen or an alkyl group having 1 to 4 carbon atoms), examples being acrylic acid, methyl acrylate, ethyl acrylate, and butyl acrylates.

In the case where the comonomer is a vinyl ester, a copolymer is also included in which one portion or all of the vinyl ester of the copolymer has been hydrolyzed, e.g. an ethylene/vinyl alcohol copolymer. In the case where the comonomer is acrylic acid or an acrylate ester, a so-called Ionomer which has been ion-bridged with a metal ion of a metal such as an alkali metal or an alkaline earth metal is also included.

The method of preparing the olefin-containing polymer (III) is not subject to any particular restrictions and can be any suitable known method.

The polymer mixture (II) is a polymer mixture comprising, in blended state, 20 to 80, preferably 40 to 70, parts by weight of a nitrile-containing polymer (A)

80 to 20, preferably 60 to 30, parts by weight of an olefin-containing polymer (B).

The nitrile-containing polymer (A) is a copolymer of (c) 20 to 90, pereferably 50 to 70, mol percent of acrylonitrile or methacrylonitrile and (d) 10 to 80, preferably 30 to 50, mol percent of at least one kind of comonomer selected from the group consisting of vinyl and vinylidene monomers.

Examples of the vinyl or vinylidene monomer in this case is the same as the comonomer in the nitrile-containing polymer (I).

A comonomer with which especially good results are obtained is, in general, a comonomer of the same kind as that in the nitrile-containing polymer (I). For example, in the case where the nitrile-containing polymer (I) is a copolymer prepared by copolymerizing acrylonitrile and an alkyl acrylate, ethyl, butyl, and octyl acrylates produce particularly good results as a comonomer of the nitrile-containing polymer (A). It is to be understood, however, that these are general trends and are not restrictive. For example, in the case of the nitrile-containing polymer (I) of the monomer constitution described hereinbefore, very good results are obtained even when the comonomer in the nitrile-containing polymer (A) is a monomer of different kind such as vinyl acetate.

Furthermore, the nitrile-containing polymer (A) may be a so-called graft polymer prepared by polymerizing a mixture of the monomers of (c) and (d) above in the presence of an elastomer such as a diene, an olefin, or an acrylic elastomer. Moreover, it may be a resin mixture of a nitrile-containing polymer (A) and another resin.

A suitable content of the acrylonitrile or methacrylonitrile of the nitrile-containing polymer (A) is in the range of 20 to 90 mol percent as set forth above. We have found that when the content of this monomer is outside of this range, the polymer mixture (II) does not exhibit sufficient adhesiveness with respect to the nitrile-containing polymer (I) and the olefin-containing polymer (III). Preferably, the range is 50 to 70 mol percent.

While the olefin polymer (B) may be a polymer selected from the same group as the olefin-containing polymer (III) and may be the same copolymer as the olefin-containing polymer (III), it is not so limited. Most preferably, this olefin-containing polymer (B) is one having a melt index of from 0.3 to 5.

The blending proportions of the polymer mixture (II) are 80 to 20 parts by weight of the olefin-containing polymer (B) with respect to 20 to 80 parts by weight of the nitrile-containing polymer (A). We have found that when the proportion of the nitrile-containing polymer (A) is less than 20 parts by weight, the adhesiveness with respect to the nitrile-containing polymer (I) is insufficient. When the proportion is greater than 80 parts by weight, the adhesiveness with respect to the olefin-containing polymer (III) is insufficient. In either case a satifactory composite structure cannot be obtained. Preferably, the proportion of the olefin-containing polymer (B) in the mixture (II) is 30 to 60.

The method of polymerization for obtaining the nitrile-containing polymer (A) is not subject to any particular restrictions, and this polymerization can be carried out by a known method in the presence of a polymerization initiator. Furthermore, the method of preparing the olefin-containing polymer (B) is not subject to any restrictions, so this can also be prepared according to a known method.

The nitrile-containing polymer (A) and the olefin-containing polymer (B) may be mixed by any of the generally known methods such as a melt mixing method in which a roll kneader, a Banbury kneader, a screw extruder, or the like is used. A method may also be employed wherein the polymers are mixed in the form of an emulsion or a solution. In the case where multilayer articles are formed by the concurrent extrusion or coextrusion method, however, the two resins (A) and (B) are subjected, as they are in powder or pellet form, to dry blending. They are then fed into an extruder in which the resins are thoroughly kneaded by a screw, whereby there is no necessity for a special kneading process step.

By the method of this invention, adhesion of the nitrile-containing polymer and the olefin-containing polymer is easily achieved. Multilayer formed articles such sheets, bottles, and films can be produced by a method such as compression molding, multilayer blow molding, multilayer inflation forming, or a multilayer extrusion method such as multilayer T-die extrusion or coextrusion.

We have found that the articles produced in accordance with the present invention exhibit excellent gas-barrier characteristics, fragrance-retaining characteristics and high practical strength. They are particularly useful when employed as packaging materials for products such as foodstuffs, pharmaceutical products, and cosmetic products. Also, these articles can be formed to possess properties in a wide range from hard formed articles resembling glass articles to flexible formed or molded articles suitable for applications requiring vessels of squeezable property such as those for ketchup, mayonnaise, toothpaste, and the like.

The number of the layers in any single laminated structure according to this invention is not limited to three, i.e., one each of the nitrile-containing polymer (I), the polymer mixture (II), and the olefin-containing polymer (III). It is possible to use any number of layers provided that a layer of the polymer mixture (II) is interposed between polymer layers (I) and (III), respectively which sould not be mutually and adjacently bonded together.

Furthermore, there is no limit, theoretically, to the total wall thickness of each laminated structure of the essential three layers of the invention. Moreover, this total thickness will depend on the kind of structure and its use. However, in most practical cases, this total thickness will probably be in the order of 0.02 to 5 mm., particularly 0.2 to 1.5 mm.

The laminated structure is produced by concurrent melt-extrusion of the three layers to be bonded together or by pressing a stack of the three layers at 120°–240° C. and at 10–1,000 kg/cm² for 0.1 to 30 minutes.

Typical examples of synthetic-resin laminated structures according to this invention are illustrated in the accompanying drawing. Layers of the nitrile-containing polymer (I), polymer mixture (II), and the olefin-containing polymer (III) are respectively indicated by reference numerals 1, 2, and 3.

FIG. 1(A) shows a three-ply sheet structure. FIG. 1(B) shows a five-ply sheet with layers 3 of the olefin-containing polymer (III) on the opposite outer surfaces and a layer of the nitrile-containing polymer (I) in the core position. FIG. 2 illustrates an example of a tubular structure according to this invention, while FIG. 3 shows an example of a bottle, which is representative of a hollow structure according to the invention.

In order to more fully illustrate the nature and utility of this invention, the following specific practical examples constituting preferred embodiments of the invention and a comparative example are set forth below. It should be understood that these examples are illustrative only and are not intended to limit the scope of the invention.

EXAMPLE 1.

Preparation of acrylonitrile-containing polymer (I) (hereinafter referred to as "polymer (I)")

The following ingredients in their respectively indicated quantities were charged into an autoclave and agitated for 20 hours with the temperature within the autoclave regulated to 40° C.

|  | Parts by weight |
| --- | --- |
| acrylonitrile | 75 |
| methyl acrylate | 25 |
| normal dodecylmercaptan | 1.8 |
| $K_2S_2O_8$ | 0.04 |
| $NaHSO_3$ | 0.01 |
| sodium dodecylbenzenesulfonate | 1.0 |

|  | Parts by weight |
|---|---|
| water | 200 |

Upon completion of the polymerization, the resulting latex was taken out and added to 450 parts of an aqueous solution of aluminum sulfate of a concentration of approximately 0.4 percent thereby to subject the latex to salting out and render it into a slurry state.

This slurry was further heated to 65° C., filtered, washed with water, and dried, whereupon an acrylonitrile/methyl acrylate copolymer of white color was obtained in a yield of 97 percent. The reduced viscosity =SP/C in a dimethylformamide solution at 30° C. of this copolymer was 0.0881 liter/g. (C = 4 grams/liter)

The acrylonitrile/methyl acrylate copolymer obtained by the above-described polymerization process was press-formed for 3 minutes at 200° C. and 200 kg./cm$^2$. thereby to form a sheet of a thickness of 0.35 mm.

For the olefin-containing polymer (III) (hereinafter referred to as "polymer (III)"), an ethylene/vinyl acetate copolymer (trademark "EVATATE" D2021, of a melt index of 1.5 and a vinyl acetate content of 10 percent by weight) was used. This copolymer was press-formed for 3 minutes at 150° C. and 200 kg./cm$^2$. thereby to form a sheet of 0.7-mm. thickness.

Preparation of acrylonitrile-containing polymer (A) (hereinafter referred to as "polymer (A)"

A monomer mixture of the following composition was prepared:

|  | Parts by weight |
|---|---|
| acrylonitrile | 60 |
| methyl acrylate | 40 |
| normal dodecylmercaptan | 1.0 |

This monomer mixture was polymerized by the process specified above for the polymer (I). The product thus obtained was filtered, washed with water, and dried, whereupon an acrylonitrile/methyl acrylate copolymer of white color was obtained in a yield of 96 percent.

For the olefin-containing polymer (B) (hereinafter referred to as "polymer (B)"), an ethylene/vinyl acetate copolymer (trademark "EVATATE" D2021, of a melt index of 1.5 and a vinyl acetae content of 10 percent by weight) was used.

40 parts of the above specified polymer (A) and 40 parts of the above identified polymer (B) were roll-blended for 3 minutes at 120° C. thereby to produce a polymer mixture (II) in the form of a sheet of 0.2-mm. thickness.

The respective sheets of the polymer (I), the polymer mixture (II), and the polymer (III) were disposed in laminar arrangement in the order named, and the resulting stack was press formed for 5 minutes at 200° C. and 200 kg./cm$^2$. thereby to form a multilayer sheet of 0.87-mm. thickness, which was used as a test specimen. In this test specimen, the thickness of the polymer (I) layer was 0.32 mm.; that of the polymer mixture (II) layer was 0.15 mm.; and that of the polymer (III) layer was 0.40 mm.

This test specimen was subjected to an 180° peel strength test, an oxygen transmission test, and a water vapor (Wt. Vap.) transmission test, whereupon the following results were obtained.

| 180° Peel strength | 300 g/cm |
|---|---|
| Wt. Vap. transmission | 2.2 g/m$^2$. 24 hr |
| Oxygen transmission | 0.8 cc/m$^2$. 24 hr. atm |

In this Example 1 and the following Examples, these tests were carried out according to the following standard specifications.
180° Peel strength test —
ASTM D903-49 Peel or Stripping Strength of Adhesion Bonds, Test for.
Water vapor transmission test
ASTM E 96-66, Water Vapor Transmission of Materials in Sheet form, Test for.
Oxygen transmission test —
ASTM D 1434-66, Gas Transmission Rate of Plastic Film and Sheeting, Test for.

COMPARISON EXAMPLE 1.

A two-layer sheet of the polymer (I) and the polymer (III) was formed by the procedure set forth in Example 1 except that the polymer mixture (II) was not used. In this sheet, which was used as a test specimen, the thickness of the polymer (I) was 0.33 mm., and the thickness of the polymer (III) was 0.42 mm.

This test specimen was subjected to the same three tests as those specified in Example 1, whereupon the following results were obtained.

| 180° Peel strength | 2 g/cm |
|---|---|
| Wat. Vap. transmission | 2.7 g/cm$^2$. 24 hr |
| Oxygen transmission | 0.8 cc/m$^2$. 24 hr atm |

EXAMPLES 2 through 6.

The procedure set forth in Example 1 was carried out except for a change of the blend ratio of the polymer (A) and the polymer (B) to those shown in Table 1 set forth hereinafter thereby to fabricate five multilayer sheets each of a thickness of 0.87 mm. each comprising respective layers of the polymer (I), the polymer mixture (II), and the polymer (III).

The results of the 180° peel strength test, the water vapor transmission test, and the oxygen transmission test carried out on these test specimens are set forth in Table 1.

EXAMPLES 7 through 10.

The procedure specified in Example 1 was carried out except for a change of the composition of the polymer (A) to those shown in Table 2 set forth hereinafter thereby to fabricate four multilayer sheets each having a thickness of 0.87 mm. each and comprising respective layers of the polymer (I), the polymer mixture (II), and the polymer (III).

These test specimens were subjected to the same three tests specified in the preceding Examples, whereupon the results set forth in Table 2 were obtained.

EXAMPLES 11, 12, and 13.

The procedure set forth in Example 9 was carried out except for substituting a low-density polyethylene (trademark "Sumikathene" G 701 of a melt index of 7), an ethylene/vinyl acetate polymer (trademark "EVATATE" VA 1717 of a melt index of 2 and a vinyl acetate content of 5 percent by weight), and an ethylene/ethyl acrylate ester copolymer (trademark "NUC EEA copolymer" DPDJ 8026 of a melt index of 13 and an ethyl acrylate ester content of 8 percent by weight) for the polymer (III). Three multilayer sheets were fabricated, each comprising respective layers of the polymer (I), the polymer mixture (II), and the polymer (III) of layer thicknesses as shown in Table 3 set forth hereinafter.

These test specimens were subjected to the same three tests specified in the preceding Examples, whereupon the results shown in Table 3 were obtained.

EXAMPLE 14.

For the polymer (A) the following composition was used.

|  | Parts by weight |
| --- | --- |
| acrylonitrile | 50 |
| methyl acrylate | 50 |
| normal dodecylmercaptan | 1.0 |

This monomer composition was polymerized by the procedure specified in Example 1, and the acrylonitrile/methyl acrylate copolymer thus obtained was used. Furthermore, for the copolymer (B), an ethylene/vinyl acetate polymer (tradmark "EVATATE" K2010 of a melt index of 3 and a vinyl acetate content of 25 percent by weight) was used.

70 parts of the above specified polymer (A) and 30 parts of the polymer (B) were roll-blended for 3 minutes at 120° C. and thus rendered into a polymer mixture (II) in the form of a sheet of 0.2-mm. thickness.

The procedure set forth in Example 1 was carried out with this sheet used for the polymer mixture (II) thereby to fabricate a test specimen in the form of a multilayer sheet comprising respective layers of the polymer (I), the polymer mixture (II), and the polymer (III).

This test specimen was subjected to the same three tests as in the preceding Examples, whereupon the results shown in Table 3 were obtained.

EXAMPLE 15.

Preparation of the polymer (A) quantities set forth below were charged into an autoclave provided with an agitator.

|  | Parts by weight |
| --- | --- |
| acrylonitrile | 70 |
| ethyl acrylate | 30 |
| "Gosenol" GH-20* | 0.2 |
| (*suspender produced by Nippon Gosei (Co.)) | |
| azo-bis-isobutyronitrile | 0.2 |
| normal dodecylmercaptan | 1.8 |
| $Na_4P_2O_7 \cdot 10H_2O$ | 0.2 |
| water | 200 |

The autoclave was purged with nitrogen, and then polymerization was carried out with agitation at 200 rpm. at 60° C. for 24 hours, whereupon a copolymer in the form of white particles was obtained in a yield of 97 percent.

With the exception of the use of this polymer (A), the procedure specified in Example 1 was carried out thereby to fabricate a test specimen in the form of a multilayer sheet comprising respective layers of the polymer (I), the polymer mixture (II), and the polymer (III). In this test specimen, the thickness of the layer of the polymer (I) was 0.30 mm.; that of the polymer mixture (II) was 0.15 mm.; and that of the polymer (III) was 0.40 mm.

This test specimen was subjected to the three tests set forth in the preceding Examples, whereupon the following results were obtained.

| 180° Peel strength | 50 g/cm |
| --- | --- |
| Wat. Vap. transmission | $2.2 \text{ g/m}^2 \cdot 24 \text{ hr}$ |
| Oxygen transmission | $0.85 \text{ cc/m}^2 \cdot 24 \text{ hr. atm}$ |

EXAMPLE 16.

Preparation of the polymer (I)

A monomer mixture of the following composition was prepared.

|  | Parts by weight |
| --- | --- |
| acrylonitrile | 80 |
| ethyl acrylate | 20 |
| normal dodecylmercaptan | 1.0 |

The monomer composition was polymerized by the process set forth for the polymer (A) in Example 15, whereupon a copolymer in the form of white particles was obtained in a yield of 95 percent.

Except for the use of the polymer (I) obtained in the above described manner, the procedure set forth in Example 1 was carried out thereby to fabricate a multilayer sheet comprising respective layers of the polymer (I), the polymer mixture (II), and the polymer (III). In this sheet, the thickness of the polymer (I) layer was 0.35 mm.; that of the polymer mixture (II) layer was 0.13 mm.; and that of the polymer (III) was 0.40 mm.

This sheet was used as a test specimen and subjected to the same three tests as in the preceding Examples, whereupon the following results were obtained.

| 180° Peel strength | 510 g/cm |
| --- | --- |
| Wat. Vap. transmission | $3.5 \text{ g/m}^2 \; 24 \text{ hr}$ |
| Oxygen transmission | $2.0 \text{ cc/m}^2 \cdot 24 \text{ hr. atm}$ |

Table 1

| Example: | 2 | 3 | 4 | 1 | 5 | 6 |
| --- | --- | --- | --- | --- | --- | --- |
| Blend ratio (by weight) | | | | | | |
| Polymer (A) | 30 | 40 | 50 | 60 | 70 | 80 |
| Polymer (B) | 70 | 60 | 50 | 40 | 30 | 20 |
| 180° Peel strength (g/cm) | 2 | 8 | 250 | 300 | 120 | 50 |
| Wat. Vap. transmission (g/m . 24 hr) | 2.2 | 2.2 | 2.2 | 2.2 | 2.2 | 2.2 |
| Oxygen transmission (cc/m² . 24 hr. atm) | 0.8 | 0.8 | 0.8 | 0.8 | 0.8 | 0.8 |

Table 2

| Example: | 7 | 8 | 9 | 1 | 10 |
| --- | --- | --- | --- | --- | --- |
| polymer (A) *AN | 30 | 40 | 50 | 60 | 75 |

Table 2-continued

| Example: | | 7 | 8 | 9 | 1 | 10 |
|---|---|---|---|---|---|---|
| Composition (ratio by weight) | **MA | 70 | 60 | 50 | 40 | 25 |
| | ***NDM | 1.0 | 1.0 | 1.0 | 1.0 | 1.8 |
| 180° Peel strength (g/cm) | | 2 | 15 | 260 | 300 | 120 |
| Wat. Vap. transmission (g/m$^2$ . 24 hr) | | 2.2 | 2.2 | 2.2 | 2.2 | 2.2 |
| Oxygen transmission (cc/m$^2$ . 24 hr. atm) | | 0.8 | 0.8 | 0.8 | 0.8 | 0.8 |

*AN : acrylonitrile
**MA : methyl acrylate
***NDM : normal dodecylmercaptan

Table 3

| Example: | 11 | 12 | 13 | 14 |
|---|---|---|---|---|
| Thickness (mm.) of | | | | |
| Polymer (I) layer | 0.30 | 0.30 | 0.30 | 0.30 |
| Polymer mix.(II) layer | 0.13 | 0.12 | 0.13 | 0.13 |
| Polymer (III) layer | *LDPF | **EVA5 | ***EEA8 | ****EVA10 |
| | 0.42 | 0.42 | 0.28 | 0.40 |
| Peel strength at 180° (g/cm) | 205 | 230 | 340 | 200 |
| Wat. Vap. transmission (g/m$^2$ . 24. hr) | 0.85 | 1.4 | 1.4 | 2.2 |
| Oxygen transmission (cc/m$^2$ . 24 hr. atm) | 0.85 | 0.85 | 0.85 | 0.85 |

*LDPE Low-density polyethylene
**EVA 5 Ethylene/vinyl acetate copolymer (vinyl acetate content 5% by wt.)
***EEA 8 Ethylene/ethyl acrylate copolymer (ethyl acrylate content 8% by wt.)
****EVA 10 Ethylene/vinyl acetate copolymer (vinyl acetate content 10% by wt.)

EXAMPLES 17 THROUGH 22.

The same composition as that used in Example 1 was used for the polymer (I), and a low-density polyethylene (trademark "Sumikathene" G201 of a melt index of 2.0) was used for the polymer (III). For the polymer mixture (II), the same polymer (A) as that used in Example 9 and an ethylene/vinyl acetate copolymer (trademark "EVATATE" H 1011 of a melt index of 0.6 and vinyl acetate content of 15 percent by weight) were blended in the ratios shown in Table 4 set forth hereinafter. Respective sheets of the polymer (I), the polymer mixture (II), and the polymer (III) were stacked in the order named and pressed for 5 minutes at 200° C. and 200 kg/cm$^2$. A test specimen was fabricated in the form of a laminated sheet of 0.60-mm. thickness for each of the above mentioned blend ratios.

In each of the six test specimens thus fabricated, the thickness of the polymer (I) layer was 0.10 mm.; that of the polymer mixture (II) layer was 0.10 mm.; and that of the polymer (III) layer was 0.40 mm.

These six test specimens were subjected to the same three tests as in the preceding Examples, whereupon the results set forth in Table 4 were obtained.

EXAMPLES 23 THROUGH 28.

For the polymer (B) an ethylene/vinyl acetate copolymer (trademark "Ultrathene" 631 of a melt index of 1.5 and a vinyl acetate content of 20 percent by weight) was used, and the polymers (A) and (B) were blended in the ratios shown in Table 5 set forth hereinafter. In all other details, the procedure specified in Example 17 was followed to fabricate six test specimens each in the form of a laminated sheet of 0.60-mm. thickness comprising respective layers of the polymer (I), the polymer mixture (II), and the polymer (III).

These six test pieces were subjected to the same three tests as in the preceding Examples, whereupon the results indicated in Table 5 were obtained.

EXAMPLES 29 THROUGH 32.

For the polymer (B), an ethylene/vinyl acetate copolymer (trademark "EVATATE" K2010 of a melt index of 3.0 and a vinyl acetate content of 25 percent by weight) was used. The polymers (A) and (B) were blended in the ratios shown in Table 6 set forth hereinafter. In all other details, the procedure specified in Example 17 was followed to fabricate 4 test specimens each in the form of a laminated sheet of 0.60-mm. thickness comprising respective layers of the polymer (I), the polymer mixture (II), and the polymer (III).

These four test pieces were subjected to the same three tests as in the preceding Examples, whereupon the results set forth in Table 6 were obtained.

EXAMPLES 33 THROUGH 38.

Preparation of polymer (I)

The following monomers and additives were charged in their respectively indicated quantities into an autoclave.

| | Parts by weight |
|---|---|
| acrylonitrile | 65 |
| methyl acrylate | 35 |
| normal dodecylmercaptan | 1.0 |
| K$_2$S$_2$O$_8$ | 0.04 |
| NaHSO$_3$ | 0.01 |
| Sodium dodecylbenzenesulfonate | 1.0 |
| water | 200 |

These monomers were then polymerized by the procedure for the preparation of the polymer (I) in Example 1, whereupon a copolymer in the form of a white powder was obtained in a yield of 94.5 percent.

This copolymer was used for polymer (I) and polymer (A), and six mixtures were prepared with blend ratios of polymers (A) and (B) as shown in Table 7 set forth hereinafter. In all other details, the procedure specified in Example 17 was followed to fabricate six test specimens each in the form of a multilayer laminated sheet of a thickness of 0.60 mm. comprising respective layers of the polymer (I), the polymer mixture (II), and the polymer (III).

These test specimens were subjected to the same three tests as in the preceding Examples, whereupon the results set forth in Table 7 were obtained.

EXAMPLE 39.

The polymer (I) specified in Example 20 was melted in an extruder and supplied at 120° C. to the dies of a blow-molding machine. Pellets of the polymer mixture (II) specified in Example 20, which had been pelletized beforehand in a pelletizer at 180° C., were melted in another extruder and supplied at 200° C. to the same dies. The polymer (III) specified in Example 20 was melted in a third extruder and supplied at 180° C. to the dies.

The dies were provided therewithin with concentric and separate passages for the three resins. The polymer (I), the polymer mixture (II), and the polymer (III) were extruded respectively through the outer, intermediate, and inner passages. A parison was extruded in this manner and was blow-molded into a bottle of 500-cc. inner capacity.

At the body part of this bottle, the bottle side wall had a total thickness of 0.33 mm. and was made up of an outer layer of 0.1-mm. thickness, an intermediate layer of 0.03-mm. thickness, and an inner layer of 0.2mm. thickness. The total outer surface area of this bottle was approximately 450 cm².

The 180° peel strength, the water vapor transmission rate and the oxygen transmission rate of this bottle were measured and found to be as follows.

| | |
|---|---|
| 180° Peel strength | 210 g/cm |
| Wat. Vap. transmission | 0.022 g/24 hr. package |
| Oxygen transmission | 0.025 cc/24 hr. atm. package |

EXAMPLE 40.

The polymer (I) as specified in Example 20 was melted in an extruder and fed at 210° C. to the dies of a blow-molding machine. Pellets previously prepared by pelletizing the polymer (A) specified in Example 20 in a pelletizer at 180° C. were mixed in pellet state with the polymer (B) specified in Example 20. The resulting pellet mixture was melted and kneaded in another extruder and supplied at 200° C. to the dies. In addition, the polymer (III) specified in Example 20 was melted in a third extruder and supplied at 180° C. to the dies.

The dies were provided therewithin with concentric and separate passages for the resins. The resins were passed through these dies to form five concentric layers, namely from the inner side outward in sequence, layers of the polymer (III), the polymer mixture (II), the polymer (I), the polymer mixture (II), and the polymer (III). A parison was thus extruded through the dies and was blow-molded into a bottle of 500-cc. inner capacity.

At the body part of this bottle, the thickness of the concentric layers were respectively, from the inner side outward, 0.1 mm., 0.015 mm., 0.02 mm., 0.02 mm., and 0.015 mm. The total outer surface area of this bottle was approximately 450 cm².

The 180° peel strength, the water vapor transmission rate, and the oxygen transmission rate of this bottle were measured and found to be as follows.

| | |
|---|---|
| 180° Peel strength | 210 g/cm |
| Wat. Vap. transmission | 0.018 g/24 hr. package |
| Oxygen transmission | 0.13 cc/24 hr. atm. package |

Table 4

| | Example: | 17 | 18 | 19 | 20 | 21 | 22 |
|---|---|---|---|---|---|---|---|
| Blend ratio (by weight) | | | | | | | |
| Polymer (A) | | 25 | 30 | 40 | 50 | 60 | 70 |
| Polymer (B) | | 75 | 70 | 60 | 50 | 40 | 30 |
| | (Unit) | | | | | | |
| 180° Peel strength | g/cm | 80 | 600 | 620 | 350 | 80 | 30 |
| Wat. Vap. transmission | g/m². 24 hr | 1.1 | 1.1 | 1.1 | 1.1 | 1.1 | 1.1 |
| Oxygen transmission | cc/m². 24 hr. atm | 2.5 | 2.5 | 2.5 | 2.5 | 2.5 | 2.5 |

Table 5

| | Example: | 23 | 24 | 25 | 26 | 27 | 28 |
|---|---|---|---|---|---|---|---|
| Blend ratio (by weight) | | | | | | | |
| Polymer (A) | | 25 | 30 | 40 | 50 | 60 | 70 |
| Polymer (B) | | 75 | 70 | 60 | 50 | 40 | 30 |
| | (Unit) | | | | | | |
| 180° Peel strength | g/cm | 50 | 125 | 700 | 340 | 120 | 30 |
| Wat. Vap. transmission | g/m². 24 hr | 1.1 | 1.1 | 1.1 | 1.1 | 1.1 | 1.1 |
| Oxygen transmission | cc/m². 24 hr. atm | 2.5 | 2.5 | 2.5 | 2.5 | 2.5 | 2.5 |

Table 6

| | Example: | 29 | 30 | 31 | 32 |
|---|---|---|---|---|---|
| Blend ratio (by weight) | | | | | |
| Polymer (A) | | 30 | 40 | 50 | 60 |
| Polymer (B) | | 70 | 60 | 50 | 40 |
| | (Unit) | | | | |
| 180° Peel strength | g/cm | 130 | 80 | 320 | 100 |
| Wat. Vap. transmission | g/m². 24 hr | 1.1 | 1.1 | 1.1 | 1.1 |
| Oxygen transmission | cc/m². 24 hr. atm | 2.5 | 2.5 | 2.5 | 2.5 |

Table 7

| | Example: | 33 | 34 | 35 | 36 | 37 | 38 |
|---|---|---|---|---|---|---|---|
| Blend ratio (by weight) | | | | | | | |
| Polymer (A) | | 30 | 40 | 50 | 60 | 70 | 80 |
| Polymer (B) | | 70 | 60 | 50 | 40 | 30 | 20 |
| | (Unit) | | | | | | |
| 180° Peel strength | g/cm | 140 | 400 | 400 | 230 | 230 | 120 |
| Wat. Vap. transmission | g/m². 24 hr | 1.2 | 1.2 | 1.2 | 1.2 | 1.2 | 1.2 |
| Oxygen transmission | cc/m². 24 hr. atm | 5.1 | 5.1 | 5.1 | 5.1 | 5.1 | 5.1 |

EXAMPLES 41 THROUGH 45.

The same polymer (I) as that specified in Example 1 was used. For the polymer (III), a polypropylene (trademark "Mitsui Noblene" EB-G of a melt index of 0.4 to 0.7) was used. The polymer (A) specified in Example 9 was used for the polymer (A), while for the polymer (B), a polypropylene for nylon adhesion (trademark "ADMER" QB 010 of a melt index 1.5) was used. These polymers (A) and (B) were mixed in the blend ratios set forth in Table 8 to prepare five polymer mixtures (II).

Five test specimens, each in the form of a multilayer sheet of 0.5-mm. thickness, were made by stacking, in each case, the polymer (I), one of the polymer mixtures (II), and the polymer (III) in the sequence named and pressing the stack at 200° C. and 200 kg./cm². for 5 minutes.

In each of these test specimens, the thickness of the layer of the polymer (I) was 0.10 mm.; that of the polymer mixture (II) layer was 0.10 mm.; and that of the polymer (III) layer was 0.30 mm.

These test specimens were subjected to the same three tests as in the preceding Examples, whereupon results as indicated in Table 8 were obtained.

EXAMPLES 46 THROUGH 50.

The same polymer (I) as that specified in Example 1 was used. For the polymer (III), a transparent polypropylene for cold resistance and impact resistance (trademark "Mitsui Noblene" GEB-G of a melt index of 0.4 to 0.7) was used. The same polymer (A) as in Example 9 was used. For the polymer (B) a polypropylene for nylon adhesion (trademark "ADMER" QF 300 of a melt in index 9.0) was used. The polymers (A) and (B) were mixed in the blend ratios set forth in Table 9 to prepare five polymer mixtures (II).

Five test specimens, each in the form of a multilayer sheet of 0.5-mm. thickness, were made by stacking, in each case, the polymer (I), one of the polymer mixture (II), and the polymer (III) in the order named and pressing the stack at 200° C. and 200 kg/cm². for 5 minutes.

In each of these test specimens, the thickness of the polymer (I) layer was 0.10 mm.; that of the polymer mixture (II) layer was 0.10 mm.; and that of the polymer (III) layer was 0.30 mm.

These test specimens were subjected to the same three tests as in the preceding Examples, whereupon results as shown in Table 9 were obtained.

In addition, a 5-ply bottle was made through the use of the same resin composition as in Example 48 by the same procedure as in Example 40 except for a melting temperature of the polymer (III) of 210° C. At the body part of this bottle, the thicknesses of the successive layers in sequence from the inner side outward were 0.2 mm., 0.01 mm., 0.04 mm., 0.01 mm., and 0.2 mm. The total outer surface area was approximately 450 cm².

This bottle was found to have sufficient peel strength for practical use and to have the following transmissions.

Water vapor transmission 0.004 g./24 hr., package
Oxygen transmission 0.07 cc./24 hr., package Table 8

|  | Example: | 41 | 42 | 43 | 44 | 45 |
|---|---|---|---|---|---|---|
| Blend ratio (by weight) | | | | | | |
| Polymer (A) | | 25 | 30 | 35 | 40 | 45 |
| Polymer (B) | | 75 | 70 | 65 | 60 | 55 |
|  | (Unit) | | | | | |
| 180° Peel strength | g/cm | 30 | 200 | 100 | 60 | 30 |
| Wat. Vap. transmission | g/m². 24 hr | 0.9 | 0.9 | 0.9 | 0.9 | 0.9 |
| Oxygen transmission | cc/m². 24 hr. atm | 2.5 | 2.5 | 2.5 | 2.5 | 2.5 |

Table 9

|  | Examples: | 46 | 47 | 48 | 49 | 50 |
|---|---|---|---|---|---|---|
| Blend ratio (by weight) | | | | | | |
| Polymer (A) | | 30 | 40 | 50 | 60 | 70 |
| Polymer (B) | | 70 | 60 | 50 | 40 | 30 |
|  | (Unit) | | | | | |
| 180° Peel strength | g/cm | 100 | 550 | 580 | 180 | 30 |
| Wat. Vap. transmission | g/m². 24 hr | 0.9 | 0.9 | 0.9 | 0.9 | 0.9 |
| Oxygen transmission | cc/m². 24 hr. atm | 2.5 | 2.5 | 2.5 | 2.5 | 2.5 |

What we claim is:

1. A synthetic-resin laminated structure comprising a first layer of a nitrile-containing polymer (I) comprising 40 to 90 mol percent of a unit of at least one member of acrylonitrile and methacrylonitrile, a second layer of a polymer mixture (II) comprising a nitrile-containing polymer (A) comprising 20 to 90 mol percent of a unit of at least one member of acrylonitrile and methacrylonitrile and an olefin-containing polymer of substantially no nitrile content (B) blended together, and a third layer of an olefin-containing polymer of substantially no nitrile content (III), said first, second and third layers being fused together in a laminated form with the second layer interposed between the first and third layers, and the 180° peel strength between the first layer and the third layer being at least 30 g/cm according to A.S.T.M. D903.

2. A synthetic-resin laminated structure as claimed in claim 1 in which the nitrile-containing polymer (I) is a member selected from the group consisting of (1) resins each formed by copolymerization of a monomer mixture of 40 to 90 mol percent of a member (a) selected from the group consisting of acrylonitrile and methacrylonitrile and 10 to 60 mol percent of at least one member (b) selected from the group consisting of monomers copolymerizable with acrylonitrile and methacrylonitrile and (2) graft copolymers produced by polymerization of said monomer mixtures of the members (a) and (b) in the presence of an elastomer selected from the group consisting of diene rubbers, ethylene-propylene copolymers and acrylate polymers; the polymer mixture (II) is a polymer mixture comprising, in a blended state, 40 to 70 parts by weight of a nitrile-containing polymer (A) and 30 to 60 parts by weight of an olefin-containing polymer of substantially no nitrile content (B), said nitrile-containing polymer (A) being a copolymer of 20 to 90 mol percent of a member (c) selected from the group consisting of acrylonitrile and methacrylonitrile and a member (d) selected from the group consisting of vinyl and vinylidene monomers, said olefin containing polymer (B) having a melt index of from 0.3 to 5; and the olefin-containing polymer of substantially no nitrile content (III) is a member selected from the group consisting of homopolymers of α-olefins and copolymers of α-olefins and other monomers copolymerizable therewith.

3. A synthetic-resin laminated structure as claimed in claim 1 which is in the form of a sheet.

4. A synthetic-resin laminated structure as claimed in claim 1 which is in the from substantially of a tubular structure.

5. A synthetic-resin laminated structure as claimed in claim 1 which is in the form of a hollow structure which is to be closed to seal the hollow interior thereof from the outside.

6. A synthetic-resin laminated structure as claimed in claim 1 which has a total thickness of the order of 0.02 to 5 mm., particularly of 0.2 to 1.5 mm.

7. A process for producing a synthetic-resin laminated structure which comprises bonding together into the laminated form, while in the molten state, a first layer of a nitrile-containing polymer (I) comprising 40 to 90 mol percent of a unit of at least one member of acrylonitrile and methacrylonitrile, a second layer of a polymer mixture (II) comprising a nitrile-containing polymer (A) comprising 20 to 90 mol percent of a unit of at least one member of acrylonitrile and methacrylonitrile and an olefin-containing polymer of substantially no nitrile content (B) blended together, and a third layer of an olefin-containing polymer of substantially no nitrile content (III), said second layer being interposed between said first and third layers, and the 180° peel strength between the first layer and the third layer being at least 30 g/cm according to A.S.T.M. D903.

8. A process for producing a synthetic-resin laminated structure as claimed in claim 7 in which (1) resins each formed by copolymerization of a monomer mixture of 40 to 90 mol percent of a member (a) selected from the group consisting of acrylonitrile and methacrylonitrile and 10 to 60 mol percent of at least one member (b) selected from the group consisting of monomers copolymerizable with acrylonitrile and methacrylonitrile and (2) graft copolymers produced by polymerization of said monomer mixtures of the members (a) and (b) in the presence of an elastomer selected from the group consisting of diene rubbers, ethylene-propylene copolymers and acrylate polymers; the polymer mixture (II) is a polymer mixture comprising, in a blended state, 40 to 70 parts by weight of a nitrile-containing polymer (A) and 30 to 60 parts by weight of an olefin-containing polymer of substantially no nitrile content (B), said nitrile-containing polymer (A) being a copolymer of 20 to 90 mol percent of a member (c) selected from the group consisting of acrylonitrile and methacrylonitrile and a member (d) selected from the group consisting of vinyl and vinylidene monomers, said olefin-containing polymer (B) having a melt index of from 0.3 to 5; and the olefin-containing polymer of substantially no nitrile content (III) is a member selected from the group consisting of homopolymers of α-olefins and copolymers of α-olefins and other monomers copolymerizable therewith.

9. A process for producing a synthetic-resin laminated structure as claimed in claim 7 in which said laminated structure is in the form of a sheet.

10. A process for producing a synthetic-resin laminated structure as claimed in claim 7 in which said laminated structure is in the form substantially of a tubular structure.

11. A process for producing a synthetic-resin laminated structure as claimed in claim 7 in which said laminated structure is in the form of a hollow structure which is to be closed to seal the hollow interior thereof from the outside.

12. A process for producing a synthetic-resin laminated structure as claimed in claim 7 in which said laminated structure has a total thickness of the order of 0.02 to 5 mm., particularly of 0.2 to 1.5 mm.

13. A synthetic resin structure according to claim 1, wherein the olefin-containing polymer is a homopolymer of an α-olefin and another monomer copolymerizable therewith.

14. A synthetic resin structure according to claim 13, wherein the olefin-containing polymer is a homopolymer of an α-olefin.

15. A process according to claim 7, wherein the olefin-containing polymer is a copolymer of an α-olefin and another monomer selected from the group consisting of a vinyl ester of the formula $CH_2=CHOOCR$ wherein R is an alkyl group having 1 to 18 carbon atoms, and an acrylic acid or an acrylate ester of the formula $CH_2=CHCOOR$ wherein R is hydrogen or an alkyl group of 1 to 4 carbons.

16. A synthetic resin structure according to claim 14, wherein the α-olefin is selected from the group consisting of ethylene, propylene and butene.

17. A synthetic resin structure according to claim 15 wherein the α-olefin is selected from the group consisting of ethylene, propylene and butene.

* * * * *